O. N. CHASE.
Microscope.
No. 56,178.
Patented July 10, 1866.
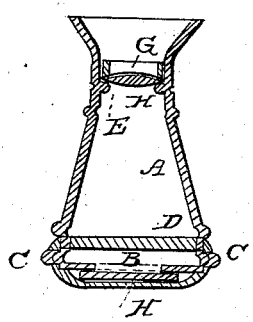
WITNESSES
James Lewis
Ehrd Hall.
INVENTOR
Otis N Chase.

United States Patent Office.

OTIS N. CHASE, OF BOSTON, MASSACHUSETTS.

IMPROVEMENT IN MICROSCOPES.

Specification forming part of Letters Patent No. 56,178, dated July 10, 1866.

*To all whom it may concern:*

Be it known that I, OTIS N. CHASE, of Boston, in the county of Suffolk, in the State of Massachusetts, have invented a new and improved microscope for testing counterfeits, goods of all kinds, viewing insects, prepared objects, &c., being adapted to all trades and professions, amusing and instructive to all; and I do hereby declare that the following is a full and exact description thereof, reference being had to the accompanying drawing, and to the letters of reference marked thereon.

The nature of my invention consists of a hollow transparent chamber, A, with an aperture, B, at the bottom, also two projections, C C, upon either side, for the purpose of holding the elastic band D in the desired position, to be more fully described hereinafter. Said transparent chamber A is also open at the top, and has a shoulder or bead, E, upon which may rest the lens F. Said lens may be of any known power. For regulating the focus the lens F may be fastened to the elastic ring G, and be raised and lowered by pushing the lens F up or down, or there may be a cap on one or both ends of chamber A, fitting closely the chamber A to cause friction, and the lens F fastened to the upper cap, and be raised and lowered for the said purpose. I employ any suitable material for said caps that will cause friction.

The aperture B may be otherwise than round, and of any desired size for the purpose of counting threads on cloth and testing other goods.

If the bottom of chamber A is made closed, there may be a space marked out on the bottom of tube A, or on the object H, cut or marked out for the above purpose.

To enable others skilled in the art to make and use my invention, I will proceed to describe its construction and operation.

I construct my microscope in the following manner: I employ a transparent chamber, A, of any desired form, open at one or both ends, at my option, with or without a shoulder or bead, E, for the lens F to rest upon, if desired.

Said lens F is held in the desired position by the friction or cap ring G coming in contact with the chamber A. There are also two projections, C C, one on each side, for the purpose of holding the elastic band D to the chamber A when one or both sides of said elastic band D are pulled down below the projections C C. This elastic band D is for the purpose of holding any object or material to the bottom of chamber A, for the purpose of closing up chamber A or viewing any object at or through the bottom of chamber A. The lens F may be fastened to the friction cap-ring G. When caps are used the projections C C, or their equivalent, may be connected with one of said caps.

The operation is as follows: For viewing insects, seed, &c., place them inside. For counterfeits, cloth, and other goods or material too large to place inside, place the microscope on the object to be viewed. For viewing prepared objects or closing up the aperture B to prevent the escape of any object inside of the microscope, take the thin prepared object H, or any thin flat material, place it on the bottom of the microscope, draw one or both sides of the elastic band D down over the object H, and it will be held in place for the above purposes. For counterfeits, cloth, &c., have the space B clear.

The focus may be arranged by raising or lowering the lens F, and is held in place by the friction cap-ring G.

I sometimes employ holes instead of projections C C, or their equivalent.

What I claim as my invention, and desire to secure by Letters Patent, is this—

1. A hollow transparent chamber, A, open at one or both ends, in combination with the lens F, substantially as described.

2. The projections C C, or their equivalents, in combination with the elastic band D, for the purpose set forth, substantially as described.

OTIS N. CHASE.

Witnesses:
MARY L. EBA,
MARY H. HARRIS.